United States Patent [19]

Mensch et al.

[11] 4,294,581
[45] Oct. 13, 1981

[54] UNIFORMLY DYED WATER-SWELLABLE CELLULOSIC FIBERS

[75] Inventors: Siegfried Mensch; Gerhard Epple, Weisenheim; Wolfgang Elser, Wachenheim, all of Fed. Rep. of Germany

[73] Assignee: BASF Aktiengesellschaft, Ludwigshafen, Fed. Rep. of Germany

[21] Appl. No.: 94,893

[22] Filed: Nov. 16, 1979

[51] Int. Cl.³ .................. C09B 1/00; C09B 1/56
[52] U.S. Cl. ............................. 8/611; 8/532; 8/678; 8/679; 8/918; 260/378; 260/383
[58] Field of Search .............. 8/54.2, 93, 532, 611, 8/678, 679, 611, 532, 678, 679, 918

[56] References Cited

U.S. PATENT DOCUMENTS

| | | | |
|---|---|---|---|
| 2,979,528 | 4/1961 | Lundsted | 260/584 B |
| 3,656,880 | 4/1972 | Blackwell | 8/21 C |
| 3,706,525 | 12/1972 | Blackwell et al. | 8/21 C |
| 3,711,245 | 1/1973 | Neumer | 8/21 C |
| 3,841,888 | 10/1974 | Belde et al. | 106/288 Q |
| 3,872,056 | 3/1975 | Daubach | 8/527 |
| 3,888,624 | 6/1975 | Blackwell et al. | 8/21 C |
| 3,899,519 | 8/1975 | Renfrew et al. | 8/524 |
| 4,049,377 | 9/1977 | Schwab et al. | 8/169 |

FOREIGN PATENT DOCUMENTS

| | | |
|---|---|---|
| 1183189 | 7/1965 | Fed. Rep. of Germany . |
| 1201933 | 6/1966 | Fed. Rep. of Germany . |
| 2751830 | 8/1978 | Fed. Rep. of Germany . |
| 1539259 | 1/1979 | United Kingdom . |
| 2033929 | 5/1980 | United Kingdom . |

*Primary Examiner*—A. Lionel Clingman
*Attorney, Agent, or Firm*—Oblon, Fisher, Spivak, McClelland & Maier

[57] ABSTRACT

Uniformly dyed water-swellable cellulosic fibers which have been produced by contacting water-swellable cellulosic fibers successively or simultaneously with water, with ethylene glycol, propylene glycol or derivatives of these and with an essentially water-insoluble dye of the formula

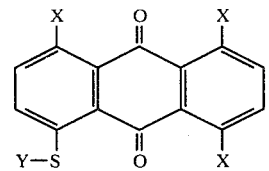

where Y is unsubstituted or substituted phenyl or naphthyl or an unsubstituted or substituted saturated or unsaturated 5-membered or 6-membered heterocyclic radical, two of the three radicals X are hydroxyl and the remaining radical X is

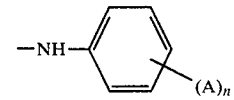

where A is chlorine, bromine, cyano, nitro, an aliphatic, cycloaliphatic, araliphatic or aromatic radical and n is 0, 1, 2 or 3 and where, if n>1, the radicals are identical or different. Deep reddish blue to green dyeings or prints are obtained. The dyeings have very good fastness characteristics.

6 Claims, No Drawings

UNIFORMLY DYED WATER-SWELLABLE CELLULOSIC FIBERS

The present invention relates to uniformly dyed water-swellable cellulosic fibers which are fast to washing, drycleaning, sublimation and light and are produced by contacting water-swellable cellulosic fibers successively or simultaneously with water, with ethylene glycol, propylene glycol or a derivative of these and, whilst the fibers are still swollen, with an essentially water-insoluble dye of the formula

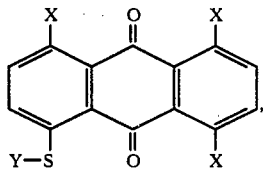

where Y is unsubstituted or substituted phenyl or naphthyl or an unsubstituted or substituted saturated or unsaturated 5-membered or 6-membered heterocyclic radical, two of the three radicals X are hydroxyl and the remaining radical X is

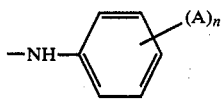

where A is chlorine, bromine, cyano, nitro, an aliphatic, cycloaliphatic, araliphatic or aromatic radical and n is 0, 1, 2 or 3 and where, if n>1, the radicals are identical or different.

Specific examples of possible meanings of the radical Y are:

(1) Unsubstituted or substituted phenyl or naphthyl: phenyl, phenyl monosubstituted or disubstituted by $C_1$–$C_4$-alkyl, chlorine, bromine, nitro, cyano, $C_1$–$C_4$-alkoxy, $C_1$–$C_4$-alkoxy-$C_2$–$C_3$-alkyl, $C_1$–$C_4$-alkylsulfonyl, $C_1$–$C_4$-alkanoylamino or phenoxy, the substituents, in the case of disubstitution, being identical or different, eg. 2-, 3- and 4-methylphenyl, 2,4-, 2,5- and 3,5-dimethylphenyl, 2-, 3- and 4-ethylphenyl, 2-, 3- and 4-propylphenyl, 2-, 3- and 4-isopropylphenyl, 2-, 3- and 4-butylphenyl, 3- and 4-isobutylphenyl, 3- and 4-sec.-butylphenyl, 2-, 3- and 4-chlorophenyl, 2,4-dichlorophenyl, 3,5-dichlorophenyl, bromophenyl, nitrophenyl, nitromethylphenyl, cyanophenyl, methoxyphenyl, dimethoxyphenyl, ethoxyphenyl, propoxyphenyl, butoxyphenyl, (2′-methoxyethyl)-phenyl, methylsulfonylphenyl, ethylsulfonylphenyl, acetylaminophenyl and phenoxyphenyl, and α- and β-naphthyl;

(2) Unsubstituted or substituted heterocyclic radicals derived from 2-mercapto-thiazole, 2-mercapto-4-($C_1$–$C_4$-alkyl)-thiazole, 2-mercapto-4-phenyl-thiazole, 2-mercapto-4-($C_1$–$C_4$-alkyl)-thiazoline, 2-mercapto-4-phenylthiazoline, 2-mercapto-5-amino-thiazole, 5-mercaptopyrazole, 2-mercaptoimidazole, 2-mercapto-3-($C_1$–$C_4$-alkyl)-imidazole, 5-mercapto-3-($C_1$–$C_4$-alkyl)-1,2,4-triazole, 5-mercapto-2-phenyl-1,3,4-thiadiazole, 2,5-dimercapto-1,3,4-thiadiazole, 5-mercapto-3-phenyl-1,2,4-thiadiazole, 5-mercapto-2-($C_1$–$C_4$-alkyl)-1,3,4-oxadiazole, 5-mercapto-2-phenyl-1,3,4-oxadiazole, 2-mercapto-pyridine, 2-mercapto-quinoline, 2-mercapto-quinazoline, 4-mercapto-quinazoline, 2-mercaptobenzimidazole, 2-mercapto-3-($C_1$–$C_4$-alkyl)-benzimidazole, 2-mercapto-benzoxazole and 2-mercapto-benzthiazole.

For tinctorial and economic reasons, Y is preferably phenyl or monosubstituted phenyl.

Examples of substituents A in the radical

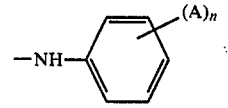

are: (a) saturated, linear or branched, $C_1$–$C_{18}$-alkyl; (b) $C_2$–$C_8$-alkyl substituted by cyano, chlorine, bromine, carbo-$C_1$–$C_5$-alkoxy, N-$C_1$–$C_8$-alkylcarbamyl, N,N-di-$C_1$–$C_8$-alkylcarbamyl, $C_1$–$C_4$-alkylsulfonyl, amino, di-$C_1$–$C_4$-alkylamino or phenoxy, the number of substituents being 2 or preferably 1; (c) $C_1$–$C_{10}$-alkoxy, alkoxyalkoxy and alkoxyalkyl of a total of 3 to 11 carbon atoms; (d) hydroxyalkoxyalkyl of a total of 4 to 10 carbon atoms, and alkoxyalkoxyalkyl of a total of 5 to 11 carbon atoms; (e) phenoxyalkoxyalkyl, where the alkoxyalkyl radical is of 4 to 6 carbon atoms; (f) saturated 5-, 6-, 7- or 8-membered cycloalkyl or polycycloalkyl of a total of 5 to 15 carbon atoms; (g) $C_5$–$C_8$-cycloalkyl which is unsubstituted or mono-, di- or tri-substituted by $C_1$–$C_8$-alkyl, cycloalkyl or hydroxyl; (h) phenylalkyl of a total of 7 to 10 carbon atoms, the alkyl being unsubstituted or substituted by hydroxyl and the phenyl being unsubstituted or substituted by $C_1$–$C_{15}$-alkyl; (i) phenyl, α-naphthyl or β-naphthyl, where phenyl and naphthyl are unsubstituted or have from 1 to 3, preferably 1 or 2, especially 1, hydrogen replaced by $C_1$–$C_{18}$-alkyl, hydroxyl, chlorine, bromine, trifluoromethyl, nitro, cyano, $C_1$–$C_5$-alkoxy, $C_1$–$C_4$-alkylthio, $C_1$–$C_5$-alkanoylamino, sulfamyl, N-$C_1$–$C_8$-alkylsulfamyl, N,N-di-$C_1$–$C_8$-alkylsulfamyl, N-phenylsulfamyl, carbamyl, N-$C_1$–$C_8$-alkylcarbamyl, N,N-di-$C_1$–$C_8$-alkylcarbamyl, N-phenylcarbamyl, the phenyl being unsubstituted or substituted by methoxy, ethoxy or methyl, carbalkoxy of a total of 2 to 6 carbon atoms, $C_1$–$C_4$-alkylsulfonyl, phenylsulfonyl, where phenyl is unsubstituted or substituted by $C_1$–$C_4$-alkyl, $C_1$–$C_4$-alkylcarbonyl, phenalkoxy of 7 to 10 carbon atoms or phenoxy, and, if more than one substituent is present, the substituents may be identical or different and, if more than one alkyl, alkoxy or alkyl and alkoxy is present, the sum of the carbon atoms in these substituents is at most 12, and where the α-naphthyl or β-naphthyl is preferably unsubstituted; (j) cyano; (k) carbalkoxy of a total of 2 to 12 carbon atoms; (l) nitro; (m) N-$C_1$–$C_8$-alkylamino and N,N-di-$C_1$–$C_8$-alkylamino; (n) carbamyl, N-$C_1$–$C_8$-alkylcarbamyl and N,N-di-$C_1$–$C_8$-alkylcarbamyl; (o) alkanoylamino of 2 to 12 carbon atoms; (p) $C_1$–$C_6$-alkylsulfonyl; (q) sulfamyl, N-$C_1$–$C_8$-alkylsulfamyl or N,N-di-$C_1$–$C_8$-alkylsulfamyl; (r) azophenyl; (s) phenoxy which is unsubstituted or where 1 or 2 hydrogens are replaced by chlorine or bromine.

Amongst the above radicals A, the following are preferred: $C_1$–$C_8$-alkyl, eg. methyl, ethyl, propyl, isopropyl, butyl, sec.-butyl, isobutyl, tert.-butyl, pentyl, hexyl, heptyl, methylbutyl, methylpentyl, methylhexyl, methylheptyl, 1,1,3-trimethylbutyl, octyl and 2-ethylhexyl; alkoxyalkyl of a total of 3 to 11 carbon atoms, eg. 2-methoxyethyl, 2-propoxyethyl, 2-isopropoxyethyl, 2-ethoxyethyl, 2-butoxyethyl, 3-methoxypropyl, 3-ethoxypropyl, 3-isopropoxypropyl, 3-propoxypropyl, 3-butoxypropyl, 2-(2′-ethylhexoxy)-ethyl and 3-(2′- ethylhexoxy)propyl; $C_1$–$C_8$-alkoxy and alkoxyalkoxy of 3 to 11 carbon atoms, eg. methoxy, ethoxy, n-propoxy, isopropoxy, butoxy, isobutoxy, hexoxy, 2-ethyl-hexoxy, 2-methoxyethoxy, 2-ethoxyethoxy and 3-(2'-ethyl-hexoxy)-propoxy; alkoxyalkoxy-alkyl of a total of 5 to 11 carbon atoms, eg. 2-(2'-methoxyethoxy)-ethyl, 2-(2'-ethoxyethoxy)-ethyl, 3-(2'-methoxyethoxy)-propyl and 3-(2'-ethoxyethoxy)-propyl; phenoxy; cyano; carbalkoxy of a total of 2 to 12 carbon atoms, eg. carbomethoxy, carboethoxy, carbo-n-propoxy, carbo-isopropoxy, carbobutoxy, carbo-(2-ethylhexoxy), carbo-(2'-methoxyethoxy) and carbo-(2'-ethoxyethoxy); carbamyl, N-$C_1$–$C_4$-alkylaminocarbamyl and N,N-di-$C_1$–$C_4$-alkylaminocarbamyl, eg. N-methylcarbamyl, N-ethylcarbamyl, N-isopropylcarbamyl, N,N-dimethylcarbamyl and N,N-diethylcarbamyl; alkanoylamino of 2 to 12 carbon atoms, eg. acetylamino, propionylamino, butyrylamino, laurylamino and 2-ethylhexanoylamino; and azophenyl.

In particular, the invention relates to fibers which have been dyed with dyes of the formulae

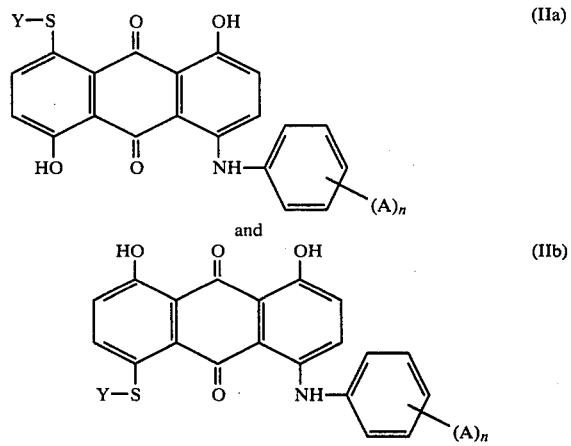

or with mixtures of these.

Fibers which have been dyed with dyes of the formulae IIa and IIb, where Y is phenyl, or phenyl substituted by $C_1$–$C_4$-alkyl, chlorine, bromine or $C_1$–$C_4$-alkoxy, or is thiazol-2-yl, 5-methylthiazol-2-yl, benzthiazol-2-yl, benzoxazol-2-yl or pyrid-2-yl, A is $C_1$–$C_4$-alkyl, $C_1$–$C_4$-alkoxy, chlorine, bromine, carbo-$C_1$–$C_4$-alkoxy, phenoxy, phenylazo, sulfamyl or carbo-$C_1$–$C_4$-alkoxy and n is 0, 1 or 2 are particularly preferred.

More especially preferred still are fibers which have been dyed with dyes of the formula IIa, where Y and A have the above meanings.

Amongst the fibers dyed with the dyes of the formula IIa, those which are very particularly preferred have been dyed with dyes where Y is phenyl, 4-chlorophenyl, 4-bromophenyl, 4-methoxyphenyl, 4-isopropylphenyl, 4-methylphenyl or 4-ethylphenyl and

is phenyl, 2- or 4-tolyl, 4-isopropylphenyl, 4-chlorophenyl, 4-bromophenyl, 2,4-dichlorophenyl, 3-carbomethoxyphenyl, 4-phenoxyphenyl, 4-phenylazophenyl, 4-methoxyphenyl or 4-ethoxyphenyl, since these dyes give particularly deep and very fast prints and dyeings.

According to their structure, the dyes of the formulae I, IIa and IIb are to be regarded as insoluble disperse dyes, which as a rule are unsuitable for dyeing cotton.

However, in the presence of swelling agents for cellulose, the dyes of the formula I can be used for dyeing and especially for printing cellulose and cellulose-containing textile materials, for example cellulose-polyester blends. Reddish blue to green prints having very good fastness characteristics are obtained. The wetfastness, fastness to crocking, fastness to drycleaning and lightfastness deserve particular mention. The dyes show no sublimation during the fixing treatment. When the prints are washed, there is no staining of any white ground which may be present.

The dyes of the formulae I, IIa and IIb are applied to cellulose or cellulose-containing textile material, for example cotton/polyester blends, by the methods described in German Pat. No. 1,811,796 and in U.S. Pat. No. 3,706,525. According to German Pat. No. 1,811,796, dyeings which are fast to washing, drycleaning, sublimation and light can be produced on water-swellable cellulosic fibers if the fibers are treated, simultaneously or successively, with water and ethylene glycol, propylene glycol or derivatives of these, and the swollen fibers are treated with certain dyes, for example those to be used according to the invention, at an elevated temperature.

The general principle of the process conditions described in German Pat. No. 1,811,796 and U.S. Pat. No. 3,706,525 also applies to the use of the dyes of the present invention.

Further, German Laid-Open Applications DOS Nos. 2,524,243 and 2,528,743 describe other processes by means of which the dyes according to the invention can be applied. Amongst these, printing processes are preferred.

For the methods of application referred to above, the dyes according to the invention are advantageously converted to aqueous formulations. These contain the finely dispersed dye in the presence of conventional dispersants, water-retaining agents and other assistants conventionally used in aqueous formulations, for example disinfectants.

Such formulations are advantageously prepared by milling a suspension of from 15 to 40, preferably from 20 to 35, parts of dye I, from 4 to 10 parts of dispersant, from 5 to 15 parts of water-retaining agent, and from 0 to 1.5 parts of disinfectant in from 76 to 33.5 parts of water in a stirred ball mill, a bead mill or a sand mill, until the particle size is about 0.5 μm or less. Dye dispersions having a good shelf life are thus obtained.

Suitable dispersants are the anionic and nonionic dispersants conventionally used for the preparation of formulations containing finely divided disperse dyes. Examples of anionic dispersants are ligninsulfonates, salts of phenol/formaldehyde/sodium sulfite condensates (German Laid-Open Application DOS No. 2,301,638), salts of 2-naphthalenesulfonic acid/formaldehyde condensates, salts of phenolsulfonic acid-/urea/formaldehyde condensates and salts of phenolsulfonic acid/urea/formaldehyde condensates which have been post-condensed with phenol and formaldehyde.

Suitable non-ionic dispersants are, in particular, ethylene oxide adducts and propylene oxide/ethylene oxide adducts. Such adducts are described, for example, in U.S. Pat. Nos. 2,979,528 and 3,841,888.

The amount of dispersant depends on the dye and on the concentration of the latter in the dispersion. As a rule, the amount of dispersant used is from 4 to 10% by weight, based on the formulation.

Suitable water-retaining agents are, in particular, glycols, eg. ethylene glycol, propylene glycol, diethylene glycol and, preferably, dipropylene glycol. The amount is in general from 5 to 15, preferably from 8 to 12, % by weight, based on the formulation.

The dyes may be prepared by various methods:

(α) 1,5-Dihydroxy-4,8-dinitroanthraquinone (III) or 1,8-dihydroxy-4,5-dinitroanthraquinone (IV) is first reacted with an amine of the formula

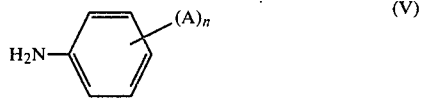

to give the corresponding dihydroxy-nitrophenylaminoanthraquinone, and then with a thio compound HS-Y (VI) to give the anthraquinone derivative I (Method A). Alternatively, (III) or (IV) may first be reacted with the thio compound HS-Y and then with the aniline derivative V (Method B).

Method A

The starting compound III or IV is reacted in the conventional manner with an amine of the formula

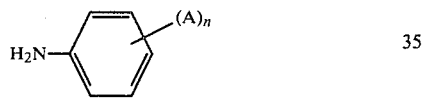

to give the dihydroxy-nitrophenylamino derivative, using an excess of the aniline as the solvent. Thereafter, in a second step, the nitro group which remains is replaced by the radical —S—Y. This reaction is advantageously carried out in the presence of a base, eg. sodium carbonate, an alkali metal hydroxide or tertiary amine, in an organic solvent, eg. an alcohol, glycol or glycol ether or, preferably, dimethylformamide (DMF) or N-methylpyrrolidone (NMP), at from 70° to 180° C. Working up is effected by stirring the mixture into methanol or by precipitating the product by adding methanol and/or water, if appropriate coupled with acidification by means of a mineral acid.

Method B

The starting compound III or IV (dinitroanthrarufin or dinitrochrysazine respectively) is reacted with the thiol derivative of the formula H-S-Y to give the corresponding mercapto derivative. In this reaction, one nitro substituent is selectively replaced by a thio substituent. The reaction is preferably carried out in the presence of a base, eg. an alkali metal carbonate, alkali metal hydroxide or tertiary amine, in an organic solvent, eg. an alcohol, glycol, glycol ether or dipolar aprotic solvent, eg. DMF, NMP or dimethylsulfoxide (DMSO), at from 0° to 100° C. Such reactions are described in German Pat. Nos. 1,201,933 and 1,183,189. The intermediate is then reacted with the amine of the formula

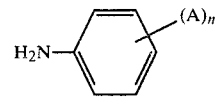

replacement of the second nitro group occurring, to give the dye of the formula I. This reaction is carried out in DMF, NMP, dimethylacetamide or hexamethylenesulfone (sulfolan), but preferably in an excess of the aniline employed, at from 100° to 220° C. After the reaction has gone to completion, the dye is precipitated by means of methanol and/or water, and is isolated.

(β) The dyes of the formula I can also be prepared from the corresponding dihydroxy-α,α'-dihaloanthraquinones, eg. from the α,α'-dichloro- or α,α'-dibromo-derivatives of anthrarutin, of chrysazine or of quinizarine. In this reaction, a halogen atom is first replaced by an appropriate aniline radical. Replacement of the remaining halogen by the thio substituent gives the dye I. It is however also possible first to react the dihalo-dihydroxyanthraquinone with the calculated amount of the thio compound (VI) and then to react the product obtained with the aniline derivative (V).

The Examples which follow illustrate the invention. Parts and percentages referred to below are by weight. Parts by volume bear the same relation to parts by weight as that of the liter to the kilogram.

EXAMPLE 1

(a) A print paste is prepared from 10 parts of the finely dispersed dye of the formula

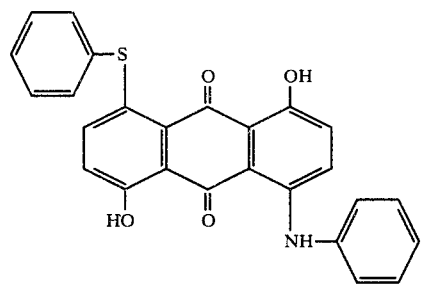

used as the formulation obtained according to (c), 100 parts of polyethylene oxide of molecular weight 300 and 790 parts of a 3% strength alginate thickener.

A cotton fabric is printed with this print paste on a rotary screen printing machine and the print is dried at 100° C. It is then heated for 1 minute at 200° C. by means of hot air, after which it is rinsed cold, soaped at the boil, again rinsed cold and dried. A deep blue wash-fast print on a white ground is obtained.

If a union fabric consisting of cotton and polyester fibers is printed in the same manner, fixed and washed, a print is obtained in which both fibers have been dyed in the same shade.

(b) The dye used was prepared as follows: 14 parts of 1,5-dihydroxy-4-anilido-8-nitroanthraquinone are introduced into a solution of 2.1 parts of potassium hydroxide and 4.2 parts of thiophenol in 150 parts by volume of dimethylformamide. The mixture is then heated for 1 hour at 80° C. and 2 hours at 100° C. When it has cooled, it is diluted with methanol and water and the resulting precipitate is filtered off, washed with methanol and then with water, and dried. Yield: 13.5 parts of 1,5-dihydroxy-4-phenylamino-8-phenylmercaptoanthraquinone.

(c) The dye obtained as described in (b) is converted to an aqueous dye formulation as follows: 30 parts of dye 1(b), 6 parts of ligninsulfonate and 10 parts of dipropylene glycol are stirred into 50 parts of water and the suspension is milled in a sand mill until the particle size is 0.5 μm or less. 1 part of pentachlorophenol is then added and the dye content is brought to 30% (based on the formulation) by adding water. The formulation obtained has a good shelf life.

EXAMPLE 2

(a) A print paste is prepared as described in Example 1(a), but using 10 parts of the dye of the formula

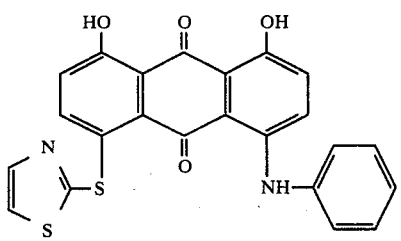

as the aqueous formulation obtained according to (c). After printing, drying and fixing, a greenish blue print, having good fastness characteristics, is obtained on cotton.

(b) The dye was prepared as follows: 13.5 parts of 1,8-dihydroxy-4-anilido-5-nitroanthraquinone are dissolved in 150 parts by volume of dimethylformamide. 2.8 parts of potassium hydroxide and 5.85 parts of 2-mercapto-thiazole are added to this solution and the mixture is then heated for 4 hours at 130° C. When the mixture has cooled, it is stirred into methanol, the batch is acidified with a small amount of 10% strength hydrochloric acid and the precipitate is filtered off, washed with methanol and dried. Yield: 11.5 parts of a deep blue powder.

(c) The dye was converted to an aqueous formulation by the method described in Example 1(c).

EXAMPLE 3

(a) A print paste is prepared as described in Example 1(a), but using, as the dye, 10 parts of the compound

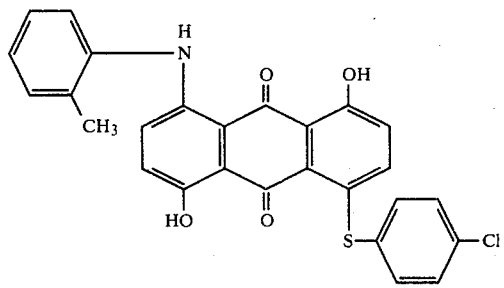

After printing and fixing as described in Example 1(a), a fast blue print is obtained on cotton and on cotton/polyester blends.

(b1) The dye used was prepared as follows: 20 parts of 1,5-dihydroxy-4,4'-chloro-phenylmercapto-8-nitroanthraquinone in 100 parts of o-toluidine are heated for 2 hours at 150° C. and 2 hours at 180° C. When a thin layer chromatogram shows that 4-phenyl-8-nitro-anthraquinone is no longer present, the mixture is cooled to 60° C. and diluted with 300 parts of methanol. The precipitate formed is then filtered off, washed with methanol and water, and dried. Yield: 13 parts of a deep blue powder.

(b2) The dye can also be prepared as follows: 17.5 parts of 1,5-dihydroxy-4-chloro-8-o-toluidinoanthraquinone are dissolved in 100 parts of DMF. 3 parts of potassium hydroxide and 8 parts of p-chlorothiophenol are added. The mixture is heated for 4 hours at 150° C. When it has cooled, it is diluted with methanol and the batch is acidified with a small amount of 10% strength hydrochloric acid and filtered. The filter residue is washed with methanol and then dried. Yield: 16 parts of a deep blue powder.

The dye was converted to a fluid formulation as described in Example 1(c).

EXAMPLES 4 TO 88

(a) Print pastes are prepared as described in Example 1(a), but using aqueous formulations of the dyes shown in the Table which follows. On cotton or cotton/polyester fabrics, prints having the hues shown in the right-hand column are obtained.

(b) The dyes referred to in the Table which follows were prepared by methods similar to those described in Examples 1(b), 2(b), 3(b) or 3(c), and were converted to aqueous formulations by the method described in Example 1(c).

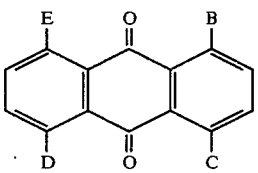

| Example | B | C | D | E | Hue on cotton or cotton/polyester |
|---|---|---|---|---|---|
| 4 | —OH | —N(H)—C₆H₅ | —OH | —S-(thiazole) | blue |

-continued

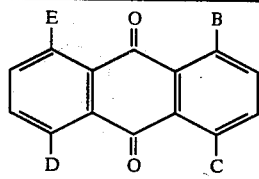

| Example | B | C | D | E | Hue on cotton or cotton/polyester |
|---|---|---|---|---|---|
| 5 | —OH | —NH—C₆H₅ | —OH | —S—C₆H₄—C(CH₃)₃ | blue |
| 6 | —OH | " | —OH | —S—C₆H₄—OCH₃ | greenish blue |
| 7 | —OH | " | —OH | —S—benzothiazol-2-yl | greenish blue |
| 8 | —OH | " | —OH | —S—(4-phenyl-thiazolin-2-yl) | blue |
| 9 | —OH | " | —OH | —S—(5-anilino-1,3,4-thiadiazol-2-yl) | blue |
| 10 | —OH | —NH—C₆H₄—Cl | —OH | —S—C₆H₅ | blue |
| 11 | —OH | " | —OH | —S—C₆H₄—OCH₃ | reddish blue |
| 12 | —OH | —NH—C₆H₄—CH₃ | —OH | —S—C₆H₄—OCH₃ | greenish blue |
| 13 | —OH | " | —OH | —S—(naphth-2-yl) | blue |
| 14 | —OH | " | —OH | —S—(pyridin-2-yl) | blue |
| 15 | —OH | " | —OH | —S—C₆H₅ | greenish blue |
| 16 | —OH | " | —OH | —S—(3-phenyl-1,2,4-thiadiazol-5-yl) | blue |
| 17 | —OH | " | —OH | —S—(1-methyl-imidazolin-2-yl) | blue |
| 18 | —OH | —NH—C₆H₄—CH₃ | —OH | —S—C(CH₃)=N—(2-phenyl) | blue |
| 19 | —OH | " | —OH | —S—(4-methyl-thiazolin-2-yl) | blue |
| 20 | —OH | —NH—C₆H₄(o-CH₃) | —OH | —S—(5-phenyl-1,3,4-oxadiazol-2-yl) | blue |

-continued

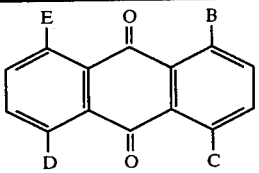

| Example | B | C | D | E | Hue on cotton or cotton/polyester |
|---|---|---|---|---|---|
| 21 | —OH | " | —OH | —S—(thiazoline) | blue |
| 22 | —OH | " | —OH | —S—C6H4—OCH3 | greenish blue |
| 23 | —OH | —NH—C6H4—CO2CH3 | —OH | —S—C6H5 | greenish blue |
| 24 | —OH | " | —OH | —S—(benzothiazole) | blue |
| 25 | —OH | " | —OH | —S—(methylthiazoline) | reddish blue |
| 26 | —OH | —NH—C6H4—O—C6H5 | —OH | —S—C6H5 | greenish blue |
| 27 | —OH | " | —OH | —S—(thiazole) | greenish blue |
| 28 | —OH | —NH—C6H4—N=N—C6H5 | —OH | —S—C6H4—OCH3 | green |
| 29 | —OH | " | —OH | —S—(thiazole) | green |
| 30 | —OH | " | —OH | —S—(thiazoline) | green |
| 31 | —OH | —NH—C6H4—OCH3 | —OH | —S—C6H5 | blue |
| 32 | —OH | " | —OH | —S—(oxadiazole-CH3) | blue |
| 33 | —OH | —NH—C6H3(Cl)2 | —OH | —S—C6H5 | reddish blue |
| 34 | —OH | " | —OH | —S—C6H4—Cl | reddish blue |
| 35 | —OH | —NH—C6H4—SO2NH2 | —OH | —S—C6H5 | blue |
| 36 | —OH | " | —OH | —S—C6H4—C(CH3)3 | blue |
| 37 | —OH | " | —OH | —S—(4-phenylthiazole) | blue |
| 38 | —OH | " | —OH | —S—(4-methylthiazoline) | blue |

-continued

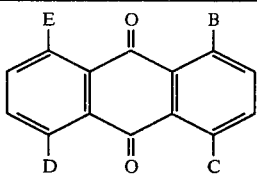

| Example | B | C | D | E | Hue on cotton or cotton/polyester |
|---|---|---|---|---|---|
| 39 | —OH | —NH—C₆H₄—SO₂NH₂ | —OH | —S—C₆H₅ | blue |
| 40 | —OH | —NH—C₆H₃(CO₂CH₃)₂ | —OH | —S—C₆H₅ | reddish blue |
| 41 | —OH | " | —OH | —S—(4-methylthiazol-2-yl) | reddish blue |
| 42 | —OH | —NH—C₆H₄—CO₂C₂H₅ | —OH | —S—C₆H₅ | reddish blue |
| 43 | —OH | " | —OH | —S—C₆H₄—OCH₃ | reddish blue |
| 44 | —OH | —NH—C₆H₅ | —S—C₆H₅ | —OH | blue |
| 45 | —OH | " | —S—C₆H₄—C(CH₃)₃ | —OH | reddish blue |
| 46 | —OH | " | —S—(benzothiazol-2-yl) | —OH | greenish blue |
| 47 | —OH | " | —S—(5-phenylamino-1,3,4-thiadiazol-2-yl) | —OH | greenish blue |
| 48 | —OH | " | —S—(4-methyl-1,3-thiazolidin-2-yl) | —OH | blue |
| 49 | —OH | —NH—C₆H₄(2-CH₃) | —S—C₆H₅ | —OH | blue |
| 50 | —OH | —NH—C₆H₄(2-CH₃) | —S—(4,5-dihydrothiazol-2-yl) | —OH | blue |
| 51 | —OH | —NH—C₆H₄—CH₃ | —S—C₆H₄—OCH₃ | —OH | greenish blue |
| 52 | —OH | " | —S—(pyridin-2-yl) | —OH | blue |
| 53 | —OH | —NH—C₆H₄—Cl | —S—C₆H₅ | —OH | blue |
| 54 | —OH | —NH—C₆H₄—Cl | —S—(4-methylthiazol-2-yl) | —OH | blue |
| 55 | —OH | —NH—C₆H₄—CO₂CH₃ | —S—C₆H₅ | —OH | blue |

-continued

[Structure: anthraquinone with substituents E (position 8/top-left), B (position 1/top-right), D (position 5/bottom-left), C (position 4/bottom-right)]

| Example | B | C | D | E | Hue on cotton or cotton/polyester |
|---|---|---|---|---|---|
| 56 | —OH | " | —S—(5-phenyl-1,3,4-thiadiazol-2-yl) | —OH | blue |
| 57 | —OH | —NH—C₆H₄—CO₂CH₃ (meta) | —S—C(=N—N=C(CH₃))—O | —OH | reddish blue |
| 58 | —OH | " | —S—(4-methyl-4,5-dihydrothiazol-2-yl) | —OH | reddish blue |
| 59 | —OH | —NH—C₆H₃(CO₂CH₃)₂ (3,5-) | —S—C₆H₅ | —OH | reddish blue |
| 60 | —OH | " | —S—(5,6-dihydro-4H-1,3-thiazin-2-yl) | —OH | reddish blue |
| 61 | —OH | " | —S—(4-methylthiazol-2-yl) | —OH | reddish blue |
| 62 | —OH | —NH—C₆H₄—OCH₃ (para) | —S—C₆H₅ | —OH | blue |
| 63 | —OH | " | —S—(benzoxazol-2-yl) | —OH | greenish blue |
| 64 | —OH | —NH—C₆H₄—OCH₃ | —S—C(=N—N=C(C₆H₅))—O | —OH | greenish blue |
| 65 | —OH | " | —S—(1-methylimidazol-2-yl) | —OH | greenish blue |
| 66 | —OH | —NH—C₆H₄—O—C₆H₅ | —S—C₆H₅ | —OH | blue |
| 67 | —OH | " | —S—(4-methylthiazol-2-yl) | —OH | greenish blue |
| 68 | —OH | " | —S—(5-methyl-4,5-dihydrothiazol-2-yl) | —OH | greenish blue |
| 69 | —OH | —NH—C₆H₄—CH(CH₃)₂ | —S—(thiazol-2-yl) | —OH | greenish blue |
| 70 | —OH | —NH—C₆H₄—N=N—C₆H₅ | —S—C₆H₅ | —OH | green |
| 71 | —OH | —NH—C₆H₄—N=N—C₆H₄—CH₃ | —S—C₆H₄—OCH₃ | —OH | green |

-continued

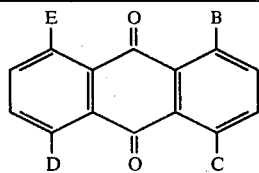

| Example | B | C | D | E | Hue on cotton or cotton/polyester |
|---|---|---|---|---|---|
| 72 | —OH | " | —S-(4-methyl-thiazol-2-yl) | —OH | green |
| 73 | —OH | " | —S-(4,5-dihydrothiazol-2-yl) | —OH | green |
| 74 | —OH | —NH-(2,4-dichlorophenyl) | —S-phenyl | —OH | reddish blue |
| 75 | —OH | —NH-(3-sulfamoylphenyl) | —S-phenyl | —OH | blue |
| 76 | —OH | " | —S-(pyridin-2-yl) | —OH | reddish blue |
| 77 | —OH | " | —S-(4-phenyl-thiazol-2-yl) | —OH | blue |
| 78 | —OH | —NH-C₆H₄-CO₂CH₂CH₂OCH₂CH₂OCH₃ | —S-phenyl | —OH | blue |
| 79 | —OH | " | —S-(thiazol-2-yl) | —OH | blue |
| 80 | —OH | " | —S-(5-phenyl-1,3,4-thiadiazol-2-yl) | —OH | blue |
| 81 | —OH | " | —S-(5-phenyl-1,3,4-oxadiazol-2-yl) | —OH | blue |
| 82 | —OH | —OH | —NH-phenyl | —S-phenyl | greenish blue |
| 83 | —OH | —OH | —NH-phenyl | —S-(5-methyl-1,3,4-oxadiazol-2-yl) | greenish blue |
| 84 | —OH | —OH | —NH-(2,4-dichlorophenyl) | —S-phenyl | greenish blue |
| 85 | —OH | —OH | —NH-(2,4-dichlorophenyl) | —S-(4,5-dihydrothiazol-2-yl) | greenish blue |
| 86 | —OH | —OH | —NH-(2-chlorophenyl) | —S-(4-chlorophenyl) | greenish blue |

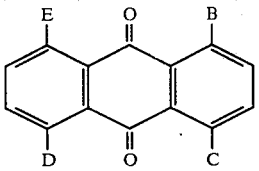

| Example | B | C | D | E | Hue on cotton or cotton/polyester |
|---|---|---|---|---|---|
| 87 | —OH | —OH | —NH—⟨⟩—CH$_3$CO$_2$ | —S—⟨⟩ | greenish blue |
| 88 | —OH | —OH | —NH—⟨⟩—CH$_3$O$_2$C | —S—[thiazole-CH$_3$] | greenish blue |

We claim:

1. Uniformly dyed water-swellable cellulosic fibers prepared by a process comprising: contacting water-swellable cellulosic fibers successively or simultaneously with water, with ethylene glycol, propylene glycol or a derivative thereof and, while the fibers are still swollen, with an essentially water-insoluble dye of the formula

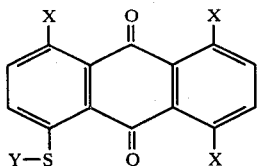

where Y is phenyl which is unsubstituted, or is monosubstituted or disubstituted by $C_1$–$C_4$-alkyl, chlorine, bromine, nitro, cyano, $C_1$–$C_4$-alkoxy, $C_1$–$C_4$-alkoxy-$C_2$–$C_3$-alkyl, $C_1$–$C_4$-alkylsulfonyl, $C_1$–$C_4$-alkanoylamino or phenoxy, the substituents, in the case of disubstitution, being identical or different, or is α- or β-naphthyl, thiazol-2-yl, 4-($C_1$–$C_4$-alkyl)-thiazol-2-yl, 4-phenylthiazol-2-yl, 4-($C_1$–$C_4$-alkyl)-thiazolin-2-yl, 4-phenylthiazolin-2-yl, 5-amino-thiazol-2-yl, pyrazol-5-yl, imidazol-2-yl, 3-($C_1$–$C_4$-alkyl)-imidazol-2-yl, 3-($C_1$–$C_4$-alkyl)-1,2,4-triazol-5-yl, 2-phenyl-1,3,4-thiadiazol-5-yl, 2- or 5-thio-1,3,4-thiadiazol-5- or -2-yl, 3-phenyl-1,2,4-thiadiazol-5-yl, 2-($C_1$–$C_4$-alkyl)-1,3,4-oxadiazol-5-yl, 2-phenyl-1,3,4-oxadiazol-5-yl, pyrid-2-yl, quinol-2-yl, quinazol-2-yl, quinazol-4-yl, benzimidazol-2-yl, 3-($C_1$–$C_4$-alkyl)-benzimidazol-2-yl, benzoxazol-2-yl or benzthiazol-2-yl, two of the three radicals X being hydroxyl and the remaining radical being

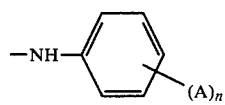

where A is (a) saturated, linear or branched, $C_1$–$C_{18}$-alkyl; (b) $C_2$–$C_8$-alkyl substituted by cyano, chlorine, bromine, carbonyl-$C_1$–$C_5$-alkoxy, N-$C_1$–$C_8$-alkylcarbamyl, N,N-di-$C_1$–$C_8$-alkylcarbamyl, $C_1$–$C_4$-alkylsulfonyl, amino, di-$C_1$–$C_4$-alkylamino or phenoxy, the number of substituents being 1 or 2; (c) $C_1$–$C_{10}$-alkoxy, alkoxyalkoxy and alkoxyalkyl of a total of 3 to 11 carbon atoms; (d) hydroxyalkoxyalkyl of a total of 4 to 10 carbon atoms, and alkoxyalkoxyalkyl of a total of 5 to 11 carbon atoms; (e) phenoxyalkoxyalkyl, where the alkoxyalkyl radical is of a total of 4 to 6 carbon atoms; (f) saturated 5-, 6-, 7- or 8-membered cycloalkyl or polycycloalkyl of a total of 5 to 15 carbon atoms; (g) $C_5$–$C_8$-cycloalkyl which is unsubstituted or mono-, di- or trisubstituted by $C_1$–$C_8$-alkyl, cycloalkyl or hydroxyl; (h) phenyl-$C_1$–$C_4$-alkyl, where alkyl is unsubstituted or substituted by hydroxyl and phenyl is unsubstituted or substituted by $C_1$–$C_{15}$-alkyl; (i) phenyl which is unsubstituted or in which from 1 to 3 hydrogen atoms are replaced by $C_1$–$C_{18}$-alkyl, hydroxyl, chlorine, bromine, trifluoromethyl, nitro, cyano, $C_1$–$C_5$-alkoxy, $C_1$–$C_4$-alkylthio, $C_1$–$C_5$-alkanoylamino, sulfamyl, N-$C_1$–$C_8$-alkylsulfamyl, N,N-di-$C_1$–$C_8$-alkylsulfamyl, N-phenylsulfamyl, carbamyl, N-$C_1$–$C_8$-alkylcarbamyl, N,N-di-$C_1$–$C_8$-alkylcarbamyl, N-phenylcarbamyl, where phenyl is unsubstituted or substituted by methoxy, ethoxy or methyl, carbalkoxy of a total of 2 to 6 carbon atoms, $C_1$–$C_4$-alkylsulfonyl, phenylsulfonyl, where phenyl is unsubstituted or substituted by $C_1$–$C_4$-alkyl, $C_1$–$C_4$-alkylcarbonyl, phenalkoxy of 7 to 10 carbon atoms or phenoxy, and, if more than one substituent is present, these may be identical or different and, if more than one alkyl, alkoxy or alkyl and alkoxy is present, the sum of the carbon atoms in these substituents is at most 12; (j) cyano; (k) carbalkoxy of a total of 2 to 12 carbon atoms; (l) nitro; (m) N-$C_1$–$C_8$-alkylamino or N,N-(di-$C_1$–$C_8$-alkyl)-amino; (n) carbamyl, N-$C_1$–$C_8$-alkylcarbamyl or N,N-di-$C_1$–$C_8$-alkylcarbamyl; (o) alkanoylamino of 2 to 12 carbon atoms; (p) $C_1$–$C_6$-alkylsulfonyl; (q) sulfamyl, N-$C_1$–$C_8$-alkylsulfamyl or N,N-di-$C_1$–$C_8$-alkylsulfamyl; (r) azophenyl; (s) phenoxy which is unsubstituted or in which 1 or 2 hydrogens are replaced by chlorine or bromine, or (t) α- or β-naphthyl, and n is 0, 1 or 2.

2. Uniformly dyed water-swellable cellulosic fibers prepared by a process comprising: contacting water-swellable cellulosic fibers successively or simultaneously with water, with ethylene glycol, propylene glycol or a derivative thereof and, while the fibers are still swollen, with at least one essentially water-insoluble dye of the formula

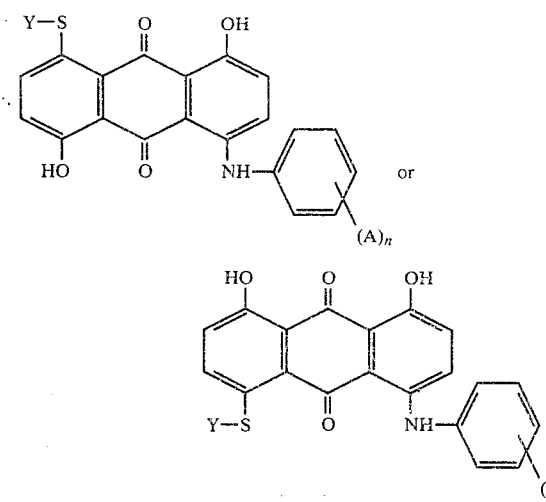

where Y is phenyl which is unsubstituted, or is monosubstituted or disubstituted by $C_1$–$C_4$-alkyl, chlorine, bromine, nitro, cyano, $C_1$–$C_4$-alkoxy, $C_1$–$C_4$-alkoxy-$C_2$–$C_3$-alkyl, $C_1$–$C_4$-alkylsulfonyl, $C_1$–$C_4$-alkanoylamino or phenoxy, the substituents, in the case of disubstitution, being identical or different, or is α- or β-naphthyl, thiazol-2-yl, 4-($C_1$–$C_4$-alkyl)-thiazol-2-yl, 4-phenylthiazol-2-yl, 4-($C_1$–$C_4$-alkyl)-thiazolin-2-yl, 4-phenylthiazolin-2-yl, 5-amino-thiazol-2-yl, pyrazol-5-yl, imidazol-2-yl, 3-($C_1$–$C_4$-alkyl)-imidazol-2-yl, 3-($C_1$–$C_4$-alkyl)-1,2,4-triazol-5-yl, 2-phenyl-1,3,4-thiadiazol-5-yl, 2- or 5-thio-1,3,4-thiadiazol-5- or -2-yl, 3-phenyl-1,2,4-thiadiazol-5-yl, 2-($C_1$–$C_4$-alkyl)-1,3,4-oxadiazol-5-yl, 2-phenyl-1,3,4-oxadiazol-5-yl, pyrid-2-yl, quinol-2-yl, quinazol-2-yl, quinazol-4-yl, benzimidazol-2-yl, 3-($C_1$–$C_4$-alkyl)-benzimidazol-2-yl, benzoxazol-2-yl or benzthiazol-2-yl, A is (a) saturated, linear or branched, $C_1$–$C_{18}$-alkyl; (b) $C_2$–$C_8$-alkyl substituted by cyano, chlorine, bromine, carbonyl-$C_1$–$C_5$-alkoxy, N-$C_1$–$C_8$-alkylcarbamyl, N,N-di-$C_1$–$C_8$-alkylcarbamyl, $C_1$–$C_4$-alkylsulfonyl, amino, di-$C_1$–$C_4$-alkylamino or phenoxy, the number of substituents being 1 or 2; (c) $C_1$–$C_{10}$-alkoxy, alkoxyalkoxy and alkoxyalkyl of a total of 3 to 11 carbon atoms; (d) hydroxyalkoxyalkyl of a total of 4 to 10 carbon atoms, and alkoxyalkoxyalkyl of a total of 5 to 11 carbon atoms; (e) phenoxyalkoxyalkyl, where the alkoxyalkyl radical is of a total of 4 to 6 carbon atoms; (f) saturated 5-, 6-, 7- or 8-membered cycloalkyl or polycycloalkyl of a total of 5 to 15 carbon atoms; (g) $C_5$–$C_8$-cycloalkyl which is unsubstituted or mono-, di- or tri-substituted by $C_1$–$C_8$-alkyl, cycloalkyl or hydroxyl; (h) phenyl-$C_1$–$C_4$-alkyl, where alkyl is unsubstituted or substituted by hydroxyl and phenyl is unsubstituted or substituted by $C_1$–$C_{15}$-alkyl; (i) phenyl which is unsubstituted or in which from 1 to 3 hydrogen atoms are replaced by $C_1$–$C_{18}$-alkyl, hydroxyl, chlorine, bromine, trifluoromethyl, nitro, cyano, $C_1$–$C_5$-alkoxy, $C_1$–$C_4$-alkylthio, $C_1$–$C_5$-alkanoylamino, sulfamyl, N-$C_1$–$C_8$-alkylsulfamyl, N,N-di-$C_1$–$C_8$-alkylsulfamyl, N-phenylsulfamyl, carbamyl, N-$C_1$–$C_8$-alkylcarbamyl, N,N-di-$C_1$–$C_8$-alkylcarbamyl, N-phenylcarbamyl, where phenyl is unsubstituted or substituted by methoxy, ethoxy or methyl, carbalkoxy of a total of 2 to 6 carbon atoms, $C_1$–$C_4$-alkylsulfonyl, phenylsulfonyl, where phenyl is unsubstituted or substituted by $C_1$–$C_4$-alkyl, $C_1$–$C_4$-alkylcarbonyl, phenalkoxy of 7 to 10 carbon atoms or phenoxy, and, if more than one substituent is present, these may be identical or different and, if more than one alkyl, alkoxy or alkyl and alkoxy is present, the sum of the carbon atoms in these substituents is at most 12; (j) cyano; (k) carbalkoxy of a total of 2 to 12 carbon atoms; (l) nitro; (m) N-$C_1$–$C_8$-alkylamino or N,N-(di-$C_1$–$C_8$-alkyl)-amino; (n) carbamyl, N-$C_1$–$C_8$-alkylcarbamyl or N,N-di-$C_1$–$C_8$-alkylcarbamyl; (o) alkanoylamino of 2 to 12 carbon atoms; (p) $C_1$–$C_6$-alkylsulfony; (q) sulfamyl, N-$C_1$–$C_8$-alkylsulfamyl or N,N-di-$C_1$–$C_8$-alkylsulfamyl; (r) azophenyl; (s) phenoxy which is unsubstituted or in which 1 or 2 hydrogens are replaced by chlorine or bromine, or (t) α- or β-naphthyl, and n is 0, 1 or 2.

3. The dyed fibers as claimed in claim 2, wherein Y is phenyl which is unsubstituted or substituted by chlorine, bromine, $C_1$–$C_4$-alkoxy or $C_1$–$C_4$-alkyl, or is thiazol-2-yl, 5-methyl-thiazol-2-yl, benzthiazol-2-yl, benzoxazol-2-yl or pyrid-2-yl, A is $C_1$–$C_4$-alkyl, chlorine, bromine, $C_1$–$C_4$-alkoxy, phenoxy, phenylazo, sulfamyl or carbo-$C_1$–$C_4$-alkoxy and n is 0, 1 or 2.

4. The dyed fibers as claimed in claim 2, wherein Y is phenyl, 4-chlorophenyl, 4-bromophenyl, 4-isopropylphenyl, 4-methoxyphenyl, 4-methylphenyl or 4-ethylphenyl and

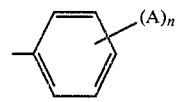

is phenyl, 2- or 4-tolyl, 4-isopropylphenyl, 4-chloro- or 4-bromo-phenyl, 2,4-dichlorophenyl, 3-carbomethoxyphenyl, 4-phenoxyphenyl, 4-phenylazophenyl, 4-methylphenyl or 4-ethoxyphenyl.

5. Uniformly dyed water-swellable cellulosic fibers prepared by a process comprising: contacting water-swellable cellulosic fibers successively or simultaneously with water, with ethylene glycol, propylene glycol or a derivative thereof and, while the fibers are still swollen, with at least one essentially water-insoluble dye of the formula

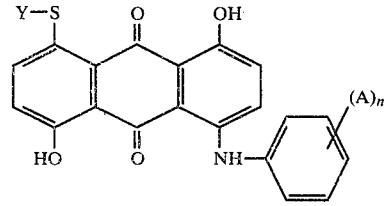

where Y is phenyl which is unsubstituted or substituted by chlorine, bromine, $C_1$–$C_4$-alkoxy or $C_1$–$C_4$-alkyl, or is thiazol-2-yl, 5-methyl-thiazol-2-yl, benzthiazol-2-yl, benzoxazol-2-yl or pyrid-2-yl, A is $C_1$–$C_4$-alkyl, chlorine, bromine, $C_1$–$C_4$-alkoxy, phenoxy, phenylazo, sulfamyl or carbo-$C_1$–$C_4$-alkoxy and n is 0, 1 or 2.

6. Dyed fibers as claimed in claim 5, where Y is phenyl, 4-chlorophenyl, 4-bromophenyl, 4-isopropylphenyl, 4-methoxyphenyl, 4-methylphenyl or 4-ethylphenyl and

is phenyl, 2- or 4-tolyl, 4-isopropylphenyl, 4-chloro- or 4-bromo-phenyl, 2,4-dichlorophenyl, 3-carbomethoxyphenyl, 4-phenoxyphenyl, 4-phenylazophenyl, 4-methoxyphenyl or 4-ethoxyphenyl.

* * * * *

UNITED STATES PATENT AND TRADEMARK OFFICE
CERTIFICATE OF CORRECTION

PATENT NO. : 4,294,581
DATED : Oct. 13, 1981
INVENTOR(S) : SIEGFRIED MENSCH ET AL

It is certified that error appears in the above-identified patent and that said Letters Patent are hereby corrected as shown below:

Please insert the following Priority Data:

[30]---Foreign Application Priority Data

Nov. 30, 1978 [DE]  Fed. Rep. of Germany.....2851751.

Signed and Sealed this

Twenty-sixth Day of January 1982

[SEAL]

Attest:

GERALD J. MOSSINGHOFF

Attesting Officer

Commissioner of Patents and Trademarks